US012680651B2

(12) United States Patent
Tomi et al.

(10) Patent No.: US 12,680,651 B2
(45) Date of Patent: Jul. 14, 2026

(54) HYDROGEN SUPPLY SYSTEM

(71) Applicant: TOYOTA JIDOSHA KABUSHIKI KAISHA, Toyota (JP)

(72) Inventors: Naoki Tomi, Kawasaki (JP); Yoshikatsu Fujimura, Toyota (JP); Tetsuya Tonosako, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/171,712

(22) Filed: Apr. 7, 2025

(65) Prior Publication Data

US 2026/0022800 A1 Jan. 22, 2026

(30) Foreign Application Priority Data

Jul. 19, 2024 (JP) ................................. 2024-115478

(51) Int. Cl.
*F17C 5/00* (2006.01)
*F23K 5/00* (2006.01)
*H01M 8/04082* (2016.01)

(52) U.S. Cl.
CPC ...... *F17C 5/007* (2013.01); *F17C 2205/0323* (2013.01); *F17C 2205/037* (2013.01); *F17C 2221/012* (2013.01); *F17C 2250/03* (2013.01); *F17C 2265/066* (2013.01); *F17C 2270/0168* (2013.01); *F17C 2270/0184* (2013.01); *F23K 5/007* (2013.01); *H01M 8/04201* (2013.01)

(58) Field of Classification Search
CPC .............. F17C 5/007; F17C 2205/0323; F17C 2205/037; F17C 2221/012; F17C 2250/03; F17C 2265/066; F17C 2270/0168; F17C 2270/0184; F23K 5/007; H01M 8/04201
USPC .......................................................... 141/383
See application file for complete search history.

(56) References Cited

U.S. PATENT DOCUMENTS

2023/0110816 A1* 4/2023 Mei ..................... H01M 16/006
429/454
2024/0209989 A1* 6/2024 Hotta .................... F17C 13/025

FOREIGN PATENT DOCUMENTS

JP 2023-056947 A 4/2023

* cited by examiner

*Primary Examiner* — Christopher M Afful
(74) *Attorney, Agent, or Firm* — SoraIP, Inc.

(57) ABSTRACT

A hydrogen supply system includes a detachable hydrogen tank, a hydrogen consumption apparatus that consumes hydrogen in the hydrogen tank, and a control device. The hydrogen consumption apparatus includes a detachment and attachment mechanism that detaches the hydrogen tank from the hydrogen consumption apparatus and attaches the hydrogen tank to the hydrogen consumption apparatus. The detachment and attachment mechanism includes a motor that controls detachment and attachment of the hydrogen tank from and to the hydrogen consumption apparatus. When a torque value of the motor exceeds a threshold during the control of the detachment and attachment of the hydrogen tank from and to the hydrogen consumption apparatus, the control device returns the hydrogen tank to a position where a moving process in which the threshold being exceeded is detected is started.

5 Claims, 5 Drawing Sheets

HYDROGEN SUPPLY SYSTEM

CROSS-REFERENCE TO RELATED APPLICATION

This application claims priority to Japanese Patent Application No. 2024-115478 filed on Jul. 19, 2024. The disclosure of the above-identified application, including the specification, drawings, and claims, is incorporated by reference herein in its entirety.

BACKGROUND

1. Technical Field

The present disclosure relates to a hydrogen supply system.

2. Description of Related Art

Japanese Unexamined Patent Application Publication No. 2023-056947 (JP 2023-056947 A) discloses a mobile unit equipped with a detachable hydrogen tank.

SUMMARY

In related art, when a hydrogen tank is detached from or attached to a hydrogen consumption apparatus using a detachment and attachment mechanism provided with a motor in a hydrogen supply system, since there is no function to stop the detachment and attachment mechanism even if foreign matter or a human hand gets caught in the detachment and attachment mechanism, the caught state continues or worsens.

The present disclosure has been made in view of the above circumstances, and a main object thereof is to provide a hydrogen supply system that can avoid foreign matter or the like remaining caught.

More specifically, the present disclosure includes the following aspects.

<1> A hydrogen supply system including:

a detachable hydrogen tank;

a hydrogen consumption apparatus that consumes hydrogen in the hydrogen tank; and a control device, in which:

the hydrogen consumption apparatus includes a detachment and attachment mechanism that detaches the hydrogen tank from the hydrogen consumption apparatus and attaches the hydrogen tank to the hydrogen consumption apparatus;

the detachment and attachment mechanism includes a motor that controls detachment and attachment of the hydrogen tank from and to the hydrogen consumption apparatus; and when a torque value of the motor exceeds a threshold during the control of the detachment and attachment of the hydrogen tank from and to the hydrogen consumption apparatus, the control device returns the hydrogen tank to a position where a moving process in which the threshold being exceeded is detected is started.

<2> The hydrogen supply system according to <1>, in which:

during detachment control of the hydrogen tank from the hydrogen consumption apparatus including connection releasing of moving the hydrogen tank from a hydrogen supply start position to a hydrogen supply standby position and separating of moving the hydrogen tank from the hydrogen supply standby position to a hydrogen supply stop position, when the torque value of the motor during the separating exceeds the threshold, the control device returns the hydrogen tank to the hydrogen supply standby position; and during attachment control of the hydrogen tank to the hydrogen consumption apparatus including approaching of moving the hydrogen tank from the hydrogen supply stop position to the hydrogen supply standby position and connecting of moving the hydrogen tank from the hydrogen supply standby position to the hydrogen supply start position, when the torque value of the motor during the approaching exceeds the threshold, the control device returns the hydrogen tank to the hydrogen supply stop position.

<3> The hydrogen supply system according to <1> or <2>, in which:

the detachment and attachment mechanism includes a detachment and attachment device to which the hydrogen tank is detachably attached; and the detachment and attachment device includes a movable portion that moves the hydrogen tank through control of the motor, and a fitting portion to be fitted with the hydrogen tank.

<4> The hydrogen supply system according to <3>, in which:

the hydrogen tank has a first connection portion;

the fitting portion has a second connection portion; and the first connection portion of the hydrogen tank and the second connection portion of the fitting portion are connected to each other when the hydrogen tank is fitted to the fitting portion.

<5> The hydrogen supply system according to <4>, in which:

the first connection portion is an on-off valve; and the second connection portion is a push rod.

The hydrogen supply system of the present disclosure can avoid foreign matter or the like remaining caught.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
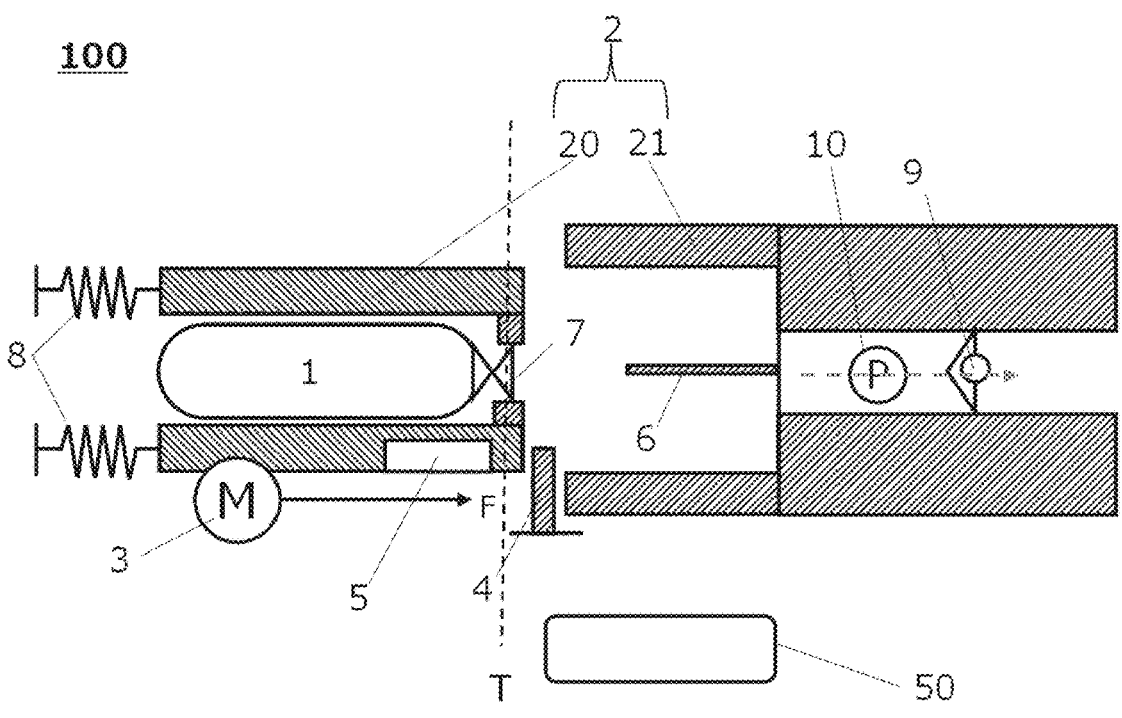
FIG. 1 is a diagram showing an example of the configuration of a hydrogen supply system of the present disclosure.

The present disclosure provides a hydrogen supply system including a detachable hydrogen tank, a hydrogen consumption apparatus that consumes hydrogen in the hydrogen tank, and a control device. The hydrogen consumption apparatus includes a detachment and attachment mechanism that detaches the hydrogen tank from the hydrogen consumption apparatus and attaches the hydrogen tank to the hydrogen consumption apparatus. The detachment and attachment mechanism includes a motor that controls detachment and attachment of the hydrogen tank from and to the hydrogen consumption apparatus. When a torque value of the motor exceeds a threshold during the control of the detachment and attachment of the hydrogen tank from and to the hydrogen consumption apparatus, the control device returns the hydrogen tank to a position where a moving process in which the threshold being exceeded is detected is started.

The hydrogen supply system of the present disclosure includes the detachable hydrogen tank, the hydrogen consumption apparatus that consumes hydrogen in the hydrogen tank, and the control device.

The hydrogen supply system of the present disclosure may be used in a mobile unit, such as a vehicle, a train, a ship, or an aircraft, or a stationary power generation system, such as a fuel cell power generator. Examples of the vehicle include a fuel cell electric vehicle, and a hydrogen-powered vehicle.

Hydrogen Tank

The hydrogen tank (hereinbelow, may be referred to as the tank) is a container that stores hydrogen, and the hydrogen is supplied from the hydrogen tank to the hydrogen consumption apparatus. The hydrogen supply system includes a plurality of (n) hydrogen tanks. "n" only needs to be an integer equal to or greater than 2, and there is no upper limit.

The hydrogen tank only needs to have a detachable configuration, and can be a known tank that can be used as the hydrogen tank.

The hydrogen tank has a hydrogen tank main body that is a portion that stores hydrogen, and a hydrogen supply port that serves as an entrance and an exit for hydrogen in the hydrogen tank main body.

The hydrogen tank may include a first connection portion (the connection portion on the hydrogen tank side) that is connected to the hydrogen consumption apparatus.

The first connection portion includes the hydrogen supply port.

The first connection portion may be, for example, an on-off valve (may be referred to as the tank shut valve).

The on-off valve may have a valve element, and the hydrogen supply port.

The valve element is a switching valve that allows and restricts communication between the inside and the outside of the hydrogen tank. The valve element is biased to restrict the communication when closed. By pressing the valve element against the biasing force, the valve element moves to allow the communication. Since the communication is allowed and restricted by pressing the valve element and releasing the pressing, the hydrogen consumption apparatus may be equipped with a push rod as means for pressing the valve element.

The push rod is inserted into the hydrogen supply port.

The hydrogen tank may be provided with a handle to be gripped when the hydrogen tank is detached from and attached to the hydrogen consumption apparatus.

Hydrogen Consumption Apparatus

The hydrogen consumption apparatus is a supply destination of hydrogen in the hydrogen tank, and receives and consumes the hydrogen.

The hydrogen consumption apparatus includes the detachment and attachment mechanism that detaches the hydrogen tank from the hydrogen consumption apparatus and attaches the hydrogen tank to the hydrogen consumption apparatus.

The detachment and attachment mechanism includes at least one motor.

The motor controls the detachment and attachment of the hydrogen tank from and to the hydrogen consumption apparatus. The hydrogen consumption apparatus may include a plurality of (n) motors corresponding one-to-one to the detachment and attachment of the (n) hydrogen tanks.

The motor may directly transmit the driving force of the motor to the hydrogen tank, or may transmit the driving force to a movable portion of a detachment and attachment device.

The motor may be a stepping motor.

The stepping motor is a power source that moves the movable portion through a gear. A specific mode of the stepping motor is not limited to any particular mode, and a known stepping motor can be used.

The stepping motor is electrically connected to the control device, and the rotation angle and the rotation speed of the stepping motor are controlled in accordance with signals from the control device, thereby accurately controlling the movement of the movable portion.

The stepping motor may include sensors such as a position sensor, a motor torque sensor, and a motor temperature sensor.

The position sensor detects the position of the hydrogen tank, in particular, the position of the on-off valve. The position sensor may detect the position of the on-off valve based on the rotation angle of the stepping motor detected by the motor torque sensor, or may detect the position of the on-off valve based on the temperature of the stepping motor detected by the motor temperature sensor.

A specific mode of each of the sensors is not limited to any particular mode, and a known sensor can be used. The sensor is electrically connected to the control device and configured to be able to transmit as a signal the measured position of the hydrogen tank to the control device.

The detachment and attachment mechanism may include a hydrogen tank biasing mechanism.

The hydrogen tank biasing mechanism means a mechanism having a biasing force that moves the hydrogen tank from a position where the first connection portion of the hydrogen tank is connected to a second connection portion of the hydrogen consumption apparatus (hydrogen supply start position) to a predetermined position in the direction in which the first connection portion of the hydrogen tank is detached from the second connection portion of the hydrogen consumption apparatus (hydrogen supply standby position) in a free state in which there is no influence of other external forces.

The hydrogen tank biasing mechanism may be a mechanism that directly transmits the biasing force of the biasing mechanism to the hydrogen tank, and may be, for example, a spring. The hydrogen tank biasing mechanism may be a spring attached to the hydrogen tank or attached to the movable portion.

The detachment and attachment mechanism may include the detachment and attachment device (attachment portion) to which the hydrogen tank is detachably attached.

The detachment and attachment device may include a fitting portion, and the movable portion.

The fitting portion is fitted with the hydrogen tank. In a state in which the hydrogen tank is attached to the detachment and attachment device, the fitting portion only needs to be fitted with at least an end portion of the hydrogen tank on the hydrogen supply port side, may be fitted with the entire hydrogen tank, or may be fitted also with an end portion of the movable portion on the side facing the fitting portion.

When the hydrogen tank is fitted to the fitting portion, the first connection portion of the hydrogen tank is connected to the second connection portion of the fitting portion.

The hydrogen consumption apparatus may include the second connection portion (the connection portion on the hydrogen consumption apparatus side).

The second connection portion is connected to the first connection portion of the hydrogen tank and constitutes a flow channel (communication) with the hydrogen tank. The second connection portion may be provided in the fitting portion of the detachment and attachment device.

The second connection portion may be, for example, a push rod.

The push rod is a member that can press the valve element provided in the on-off valve of the hydrogen tank. The push rod may have a rod shape and may press the valve element with its tip. The push rod may be configured to be insertable into the hydrogen supply port of the on-off valve.

In addition, the push rod may be configured to constitute a channel such that hydrogen flows from the inside of the hydrogen tank to the supply channel when the push rod presses the valve element to bring the on-off valve into an open state.

The detachment and attachment mechanism may have a lock portion that locks the hydrogen tank at a predetermined position when restricting the movement of the hydrogen tank.

The predetermined position may be the hydrogen supply start position or may be the hydrogen supply standby position.

The lock portion locks the hydrogen tank at the predetermined position to bring the hydrogen tank into a locked state in which the movement of the hydrogen tank is restricted in lock control, and releases the lock to bring the hydrogen tank into an unlocked state in which the movement of the hydrogen tank is allowed in unlock control.

The lock portion is electrically connected to the control device. The control device drives the lock portion to perform switching between the locked state in which the movement of the hydrogen tank is restricted and the unlocked state in which the movement of the hydrogen tank is allowed in accordance with an input signal.

The lock portion may be, for example, a lock pin.

The lock pin may be disposed on the fitting portion.

The lock pin is projectable into and retractable from an engagement recess of the movable portion. When the lock pin projects, the lock pin enters the inside of the engagement recess and can be engaged with the engagement recess. On the other hand, when the lock pin retracts, the lock pin is not engaged with the engagement recess.

The lock pin is electrically connected to the control device, and its projection and retraction is controlled based on a signal from the control device.

The movable portion moves the hydrogen tank through control of the motor. The movable portion moves in the directions in which the first connection portion of the hydrogen tank approaches and separates from the second connection portion of the hydrogen consumption apparatus. The movable portion moves the hydrogen tank between a hydrogen supply stop position, the hydrogen supply standby position, and the hydrogen supply start position.

The movable portion may have a tank insertion hole.

The tank insertion hole may be a space in which the hydrogen tank is stored. The tank insertion hole may have an opening through which the hydrogen tank can be inserted into and removed from the tank insertion hole, and may be a space surrounded by an inner wall.

The movable portion may have the engagement recess (positioning hole) that is engageable with the lock portion.

The engagement recess may be provided on the lower face side of the movable portion. A specific form of the engagement recess is not limited to any particular form as long as the lock pin can be engaged with and disengaged from the engagement recess. The engagement recess may be a depression or a groove.

The width (the size in the moving direction of the movable portion) of the engagement recess may be larger than the width of the lock pin. This enables the movable portion to move within the range of the width of the engagement recess even in a state in which the lock pin projects to enter the inside of the engagement recess.

The movable portion may be a movable placement stand.

The movable placement stand is a member having an upper face on which the hydrogen tank can be placed. When the movable placement stand has the tank insertion hole on its upper face side, the hydrogen tank can be inserted into and fixed to the tank insertion hole. The movable placement stand means a movable stand that is movable with the hydrogen tank placed thereon in the direction in which the first connection portion of the hydrogen tank is connected to the second connection portion of the hydrogen consumption apparatus and the direction in which the first connection portion of the hydrogen tank is detached from the second connection portion of the hydrogen consumption apparatus. Although means for the movement is not limited to any particular means, the means may be, for example, a combination of a rail and a wheel.

The movable placement stand may be a base (tank placement stand).

The hydrogen consumption apparatus may include a hydrogen consumption device.

Examples of the hydrogen consumption device include a fuel cell, a hydrogen engine, and a combustion portion of a hydrogen burner.

The hydrogen consumption apparatus may include a supply channel (hydrogen pipe).

The supply channel is a route that guides the hydrogen from the hydrogen tank to the hydrogen consumption device, and composed of a pipe. The supply channels extending from the hydrogen tanks may be joined to constitute one supply channel, and the joined supply channel may be connected to the hydrogen consumption device.

The hydrogen consumption apparatus may include an injection.

The injection is disposed in the supply channel between the second connection portion and the hydrogen consumption device, and controls the supply of hydrogen to the hydrogen consumption device. Examples of the injection include a check valve, and a flow control valve.

The hydrogen consumption apparatus may include a pressure gauge.

The pressure gauge may be provided in each supply channel corresponding to the internal pressure of each hydrogen tank, and may measure the internal pressure of each supply channel (the pressure inside the pipe).

The pressure gauge is configured to be able to transmit the obtained pressure value data to the control device.

In the hydrogen consumption apparatus, insertion and fixing of the hydrogen tank, attachment of the hydrogen tank, and detachment of the hydrogen tank are performed.

The insertion and fixing (setting) of the hydrogen tank means the operation of positioning the hydrogen tank at the position where the attachment of the hydrogen tank is started (hydrogen supply stop position). Specifically, the operation may be a manual operation of inserting and fixing the hydrogen tank to the tank insertion hole of the movable portion of the detachment and attachment device of the detachment and attachment mechanism of the hydrogen consumption apparatus by a person from outside of the hydrogen supply system.

The attachment of the hydrogen tank means the operation of connecting the hydrogen tank and the hydrogen consumption apparatus to each other such that the hydrogen tank can supply hydrogen to the hydrogen consumption apparatus. Specifically, the attachment of the hydrogen tank means the operation of moving the hydrogen tank from the hydrogen supply stop position to the position where accurate alignment for connecting the first connection portion of the hydrogen tank and the second connection portion of the hydrogen consumption apparatus to each other is started (hydrogen supply standby position), and further moving the hydrogen tank from the hydrogen supply standby position to the position where the first connection portion of the hydrogen tank and the second connection portion of the hydrogen consumption apparatus are connected to each other (hydrogen supply start position) to connect the paired connection portions to each other.

The detachment of the hydrogen tank means the operation of releasing the connection between the first connection portion of the hydrogen tank and the second connection portion of the hydrogen consumption apparatus, moving the hydrogen tank from the hydrogen supply start position to the hydrogen supply standby position, and moving the hydrogen tank from the hydrogen supply standby position to the hydrogen supply stop position to enable the hydrogen tank to be taken out.

The hydrogen supply stop position is the position where the attachment of the hydrogen tank to the hydrogen consumption apparatus is started and the hydrogen tank can be taken out. Specifically, the hydrogen supply stop position is the position where the hydrogen tank is manually inserted into and fixed to the tank insertion hole of the movable portion of the detachment and attachment device of the detachment and attachment mechanism of the hydrogen consumption apparatus by a person from the outside of the hydrogen supply system. The hydrogen supply stop position may be a position that is farther from the fitting portion of the detachment and attachment device than the hydrogen supply standby position is. Specifically, the hydrogen supply stop position may be a position where the first connection portion of the hydrogen tank and the second connection portion of the hydrogen consumption apparatus are not connected to each other, the movable portion and the fitting portion are not in contact with each other, and it is impossible for the lock pin to perform lock. The position where it is impossible for the lock pin to perform lock means a position where, in the movable direction of the movable portion of the detachment and attachment device, the distance from the push rod to the engagement recess of the movable portion is longer than the distance from the push rod to the lock pin.

The hydrogen supply standby position only needs to be a position where the hydrogen tank is not connected to the hydrogen consumption apparatus and cannot supply hydrogen to the hydrogen consumption apparatus, and is on standby for supply of hydrogen. The hydrogen supply standby position may be a position where the first connection portion of the hydrogen tank and the second connection portion of the hydrogen consumption apparatus are not connected each other. The hydrogen supply standby position may be, for example, a position where the accurate alignment for connecting the first connection portion of the hydrogen tank and the second connection portion of the hydrogen consumption apparatus to each other is started by control of the motor. Specifically, the hydrogen supply standby position may be a position where the first connection portion of the hydrogen tank and the second connection portion of the hydrogen consumption apparatus are not connected to each other and the movable portion and the fitting portion are in contact with each other, and the lock pin can perform lock.

The hydrogen supply start position only needs to be a position where the hydrogen tank and the hydrogen consumption apparatus are connected to each other such that the hydrogen tank can supply hydrogen to the hydrogen consumption apparatus. Specifically, the hydrogen supply start position may be a position where the first connection portion of the hydrogen tank and the second connection portion of the hydrogen consumption apparatus are connected to each other by control of the motor.

Control Device

The control device is a device that performs, for example, control for connecting the hydrogen tank to the hydrogen consumption apparatus. The control device is a device that performs, for example, control for connecting the first connection portion (e.g., the on-off valve) of the hydrogen tank to the second connection portion (e.g., the push rod) of the hydrogen consumption apparatus. The control device may be configured to be able to communicate with the lock pin, the stepping motor, the various sensors, the injection, and the pressure gauge.

The control device may be a processor, and may include a central processing unit (CPU) that performs calculations, a random access memory (RAM) that functions as a work area, a read-only memory (ROM) that functions as a recording medium, a reception unit that is an interface that receives information to the control device regardless of in a wired manner or wirelessly, and a transmission unit that is an interface that transmits information from the control device to the outside regardless of in a wired manner or wirelessly.

Thus, the control device may be configured such that the various sensors and the pressure gauge are connected to the reception unit to receive information, and the lock pin, the stepping motor, and the injection are connected to the transmission unit to transmit signals for their actuation.

The control device may be, for example, an electronic control unit (ECU).

The control device may determine whether a torque value of the motor exceeds a threshold during the control of the detachment and attachment of the hydrogen tank from and to the hydrogen consumption apparatus.

When the torque value of the motor exceeds the threshold during the control of the detachment and attachment of the hydrogen tank from and to the hydrogen consumption apparatus, the control device returns the hydrogen tank to the position where a moving process in which the threshold being exceeded is detected is started.

The torque value of the motor may be detected by the motor torque sensor. The torque of the motor may be continuously monitored. The threshold for the torque value of the motor may be set as appropriate, taking into consideration the performance of the motor.

When the torque value of the motor of the detachment and attachment mechanism exceeds the threshold, the control device determines that there is foreign matter or the like getting caught in the movable portion, and returns the hydrogen tank to the its original position, thereby making it possible to avoid the foreign matter or the like remaining caught.

The control device performs detachment and attachment control for detaching and attaching the hydrogen tank from and to the hydrogen consumption apparatus.

The detachment and attachment control includes detachment control, and attachment control.

The detachment control includes a connection releasing step, and a separating step.

The connection releasing step is the step of moving the hydrogen tank relative to the hydrogen consumption apparatus from the hydrogen supply start position to the hydrogen supply standby position. The connection releasing step releases the connection between the hydrogen consumption apparatus and the hydrogen tank.

The separating step is the step of moving the hydrogen tank relative to the hydrogen consumption apparatus from the hydrogen supply standby position to the hydrogen supply stop position. The separating step enables the hydrogen tank to be taken out of the hydrogen consumption apparatus.

The attachment control includes an approaching step, and a connecting step.

The approaching step is the step of moving the hydrogen tank relative to the hydrogen consumption apparatus from the hydrogen supply stop position to the hydrogen supply standby position. The approaching step positions the hydrogen tank at the position where the hydrogen tank is on standby for the supply of hydrogen to the hydrogen consumption apparatus.

The connecting step is the step of moving the hydrogen tank relative to the hydrogen consumption apparatus from the hydrogen supply standby position to the hydrogen supply start position. The connecting step connects the hydrogen tank and the hydrogen consumption apparatus to each other such that the hydrogen tank can supply hydrogen to the hydrogen consumption apparatus.

During the detachment control, the control device returns the hydrogen tank to the hydrogen supply start position when the torque value of the motor during the connection releasing step exceeds the threshold, and returns the hydrogen tank to the hydrogen supply standby position when the torque value of the motor during the separating step exceeds the threshold.

During the attachment control, the control device returns the hydrogen tank to the hydrogen supply stop position when the torque value of the motor during the approaching step exceeds the threshold, and returns the hydrogen tank to the hydrogen supply standby position when the torque value of the motor during the connecting step exceeds the threshold.

FIG. 1 is a diagram showing an example of the configuration of the hydrogen supply system of the present disclosure.

A hydrogen supply system 100 shown in FIG. 1 includes a hydrogen tank 1, a detachment and attachment device 2, a stepping motor 3, a lock pin 4, a positioning hole 5, a push rod 6, an on-off valve 7, a spring 8, a check valve 9, a pressure sensor 10, a supply channel 11, a movable portion 20, a fitting portion 21, and a control device 50. "F" indicates a positioning direction, and a dashed-line arrow indicates the flow of hydrogen. The hydrogen is supplied to a hydrogen consumption device (not shown) through the supply channel 11.

As shown in FIG. 1, the hydrogen tank 1 is positioned at a hydrogen supply stop position T in a state in which the on-off valve 7 of the hydrogen tank 1 and the push rod 6 inside the fitting portion 21 of the detachment and attachment device 2 are not connected to each other, the movable portion 20 and the fitting portion 21 are not in contact with each other, and the movable portion 20 is not locked by the lock pin 4 at the positioning hole 5.

The hydrogen tank 1 positioned at the hydrogen supply stop position T is inserted and fixed in a tank insertion hole of the movable portion 20 of the detachment and attachment device 2 at a position where fitting of the hydrogen tank 1 to the fitting portion 21 of the detachment and attachment device 2 (attachment to the detachment and attachment device 2) is started.

The hydrogen supply stop position T has a farther distance from the push rod 6 than the distance from the push rod 6 to the lock pin 4 in the movable direction of the movable portion 20 of the detachment and attachment device 2.

The position of the hydrogen tank 1 shown in FIG. 1 is also one of the positions where the attachment control of the present disclosure is started.

Figure 2:
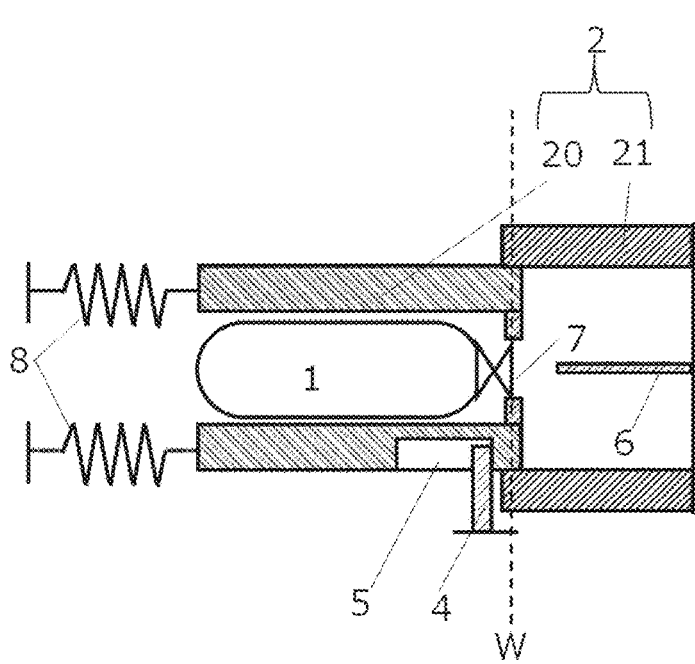
FIG. 2 is a schematic diagram showing an example of the state of a hydrogen tank positioned at a hydrogen supply standby position W.

FIG. 2 is a schematic diagram showing an example of the state of the hydrogen tank positioned at a hydrogen supply standby position W.

As shown in FIG. 2, the hydrogen tank 1 is positioned at the hydrogen supply standby position W in a state in which the on-off valve 7 of the hydrogen tank 1 and the push rod 6 inside the fitting portion 21 of the detachment and attachment device 2 are not connected to each other, the movable portion 20 and the fitting portion 21 are in contact with each other, and the lock pin 4 abuts against the positioning hole 5 of the movable portion 20 by the spring force of the spring 8. The on-off valve 7 of the hydrogen tank 1 is not connected to the push rod 6 inside the fitting portion 21 of the detachment and attachment device 2, and the on-off valve 7 is in a closed state.

The hydrogen tank 1 positioned at the hydrogen supply standby position W is not fitted in the fitting portion 21 of the detachment and attachment device 2 (not attached to the detachment and attachment device 2) and separated from the detachment and attachment device 2.

The position of the hydrogen tank 1 shown in FIG. 2 is also one of the positions where the attachment control of the present disclosure is started.

Figure 3:
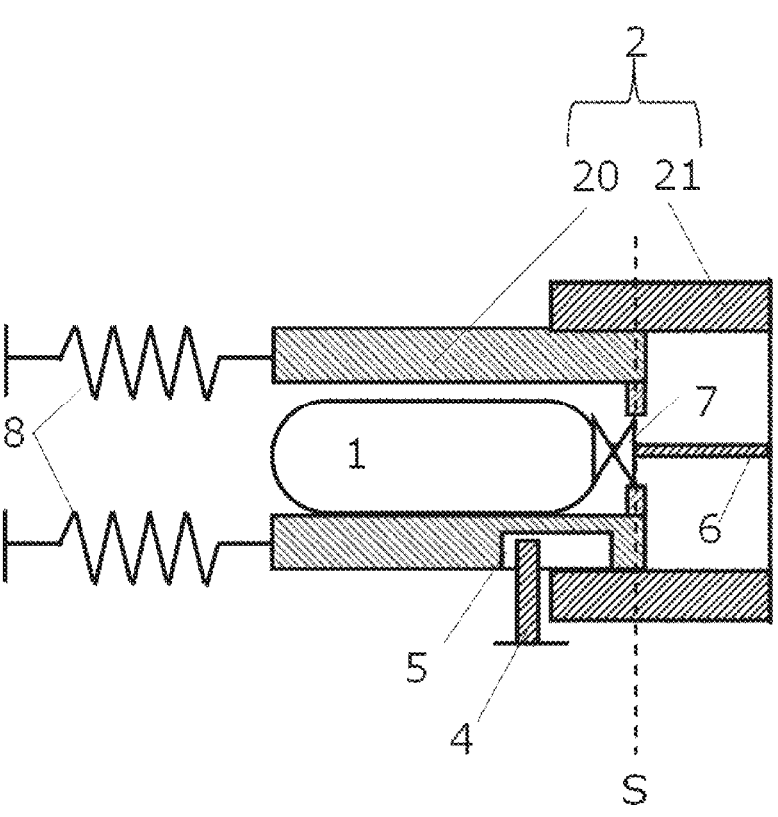
FIG. 3 is a schematic diagram showing an example of the state of the hydrogen tank positioned at a hydrogen supply start position S.

FIG. 3 is a schematic diagram showing an example of the state of the hydrogen tank positioned at a hydrogen supply start position S.

As shown in FIG. 3, the hydrogen tank 1 is positioned at the hydrogen supply start position S in a state in which the on-off valve 7 of the hydrogen tank 1 and the push rod 6 inside the fitting portion 21 of the detachment and attachment device 2 are connected to each other, and the movable portion 20 is locked by the lock pin 4 at the positioning hole 5. The on-off valve 7 of the hydrogen tank 1 is connected to the push rod 6 inside the fitting portion 21 of the detachment and attachment device 2, and the on-off valve 7 is in an open state.

The hydrogen tank 1 positioned at the hydrogen supply start position S is fitted to the fitting portion 21 of the detachment and attachment device 2 and attached to the detachment and attachment device 2.

The position of the hydrogen tank 1 shown in FIG. 3 is also the position where the detachment control of the present disclosure is started.

Figure 4:
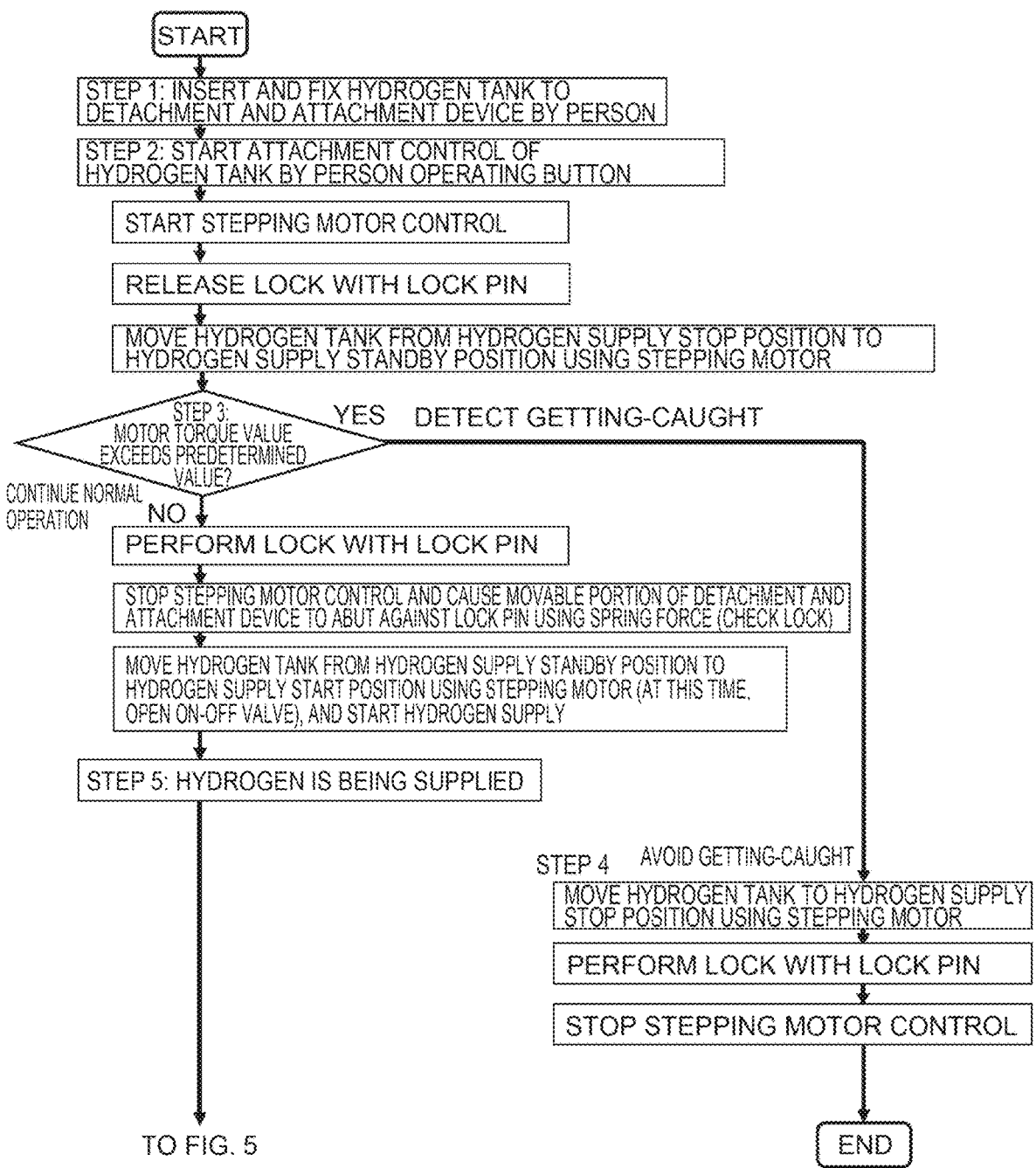
FIG. 4 is a flowchart showing the first half of an example of control of the present disclosure.

FIG. 4 is a flowchart showing the first half of an example of control of the present disclosure.

STEP 1: Insert and fix the hydrogen tank to the detachment and attachment device by a person:

dcm1=dstp

STEP 2: Start the attachment control of the hydrogen tank by a person operating a button:

xh2sply=ON

Start stepping motor control:

xmot1=ON

Release lock with the lock pin:

xlck1=ON

Move the hydrogen tank from the hydrogen supply stop position to the hydrogen supply standby position using the stepping motor:

dcm1=dstb

STEP 3: Detect foreign matter or the like getting caught and perform the following getting-caught avoidance process when a motor torque value exceeds a predetermined value.

STEP 4: Move the hydrogen tank to the hydrogen supply stop position using the stepping motor:

dcm1=dstp

Perform lock with the lock pin:

xlck1=OFF

Stop stepping motor control:

xmot1=OFF

STEP 3: Continue the following normal operation when the motor torque value is equal to or less than the predetermined value Perform lock with the lock pin:

xlck1=OFF

Stop the stepping motor control and cause the movable portion of the detachment and attachment device to abut against the lock pin using the spring force (check lock):

xmot1=OFF

Move the hydrogen tank from the hydrogen supply standby position to the hydrogen supply start position using the stepping motor (at this time, open the on-off valve), and start hydrogen supply:

xmot1=ON, dcm1=dsply

STEP 5: Hydrogen is being supplied

Figure 5:
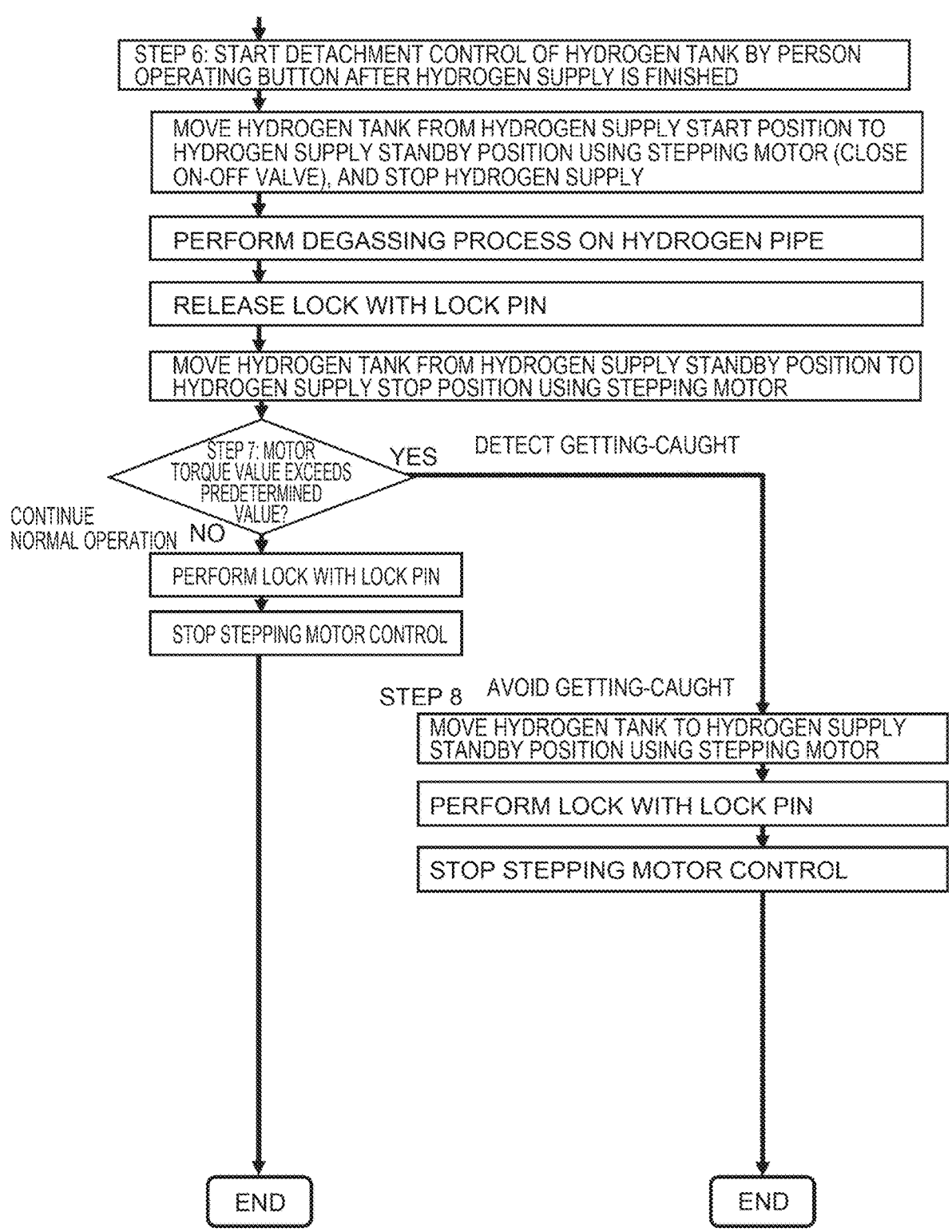
FIG. 5 is a flowchart showing the second half of the example of the control of the present disclosure.

FIG. 5 is a flowchart showing the second half of the example of the control of the present disclosure.

STEP 6: Start the detachment control of the hydrogen tank by a person operating a button after the hydrogen supply is finished:

xh2sply=OFF

Move the hydrogen tank from the hydrogen supply start position to the hydrogen supply standby position using the stepping motor (close the on-off valve), and stop the hydrogen supply:

dcm1=dstb

Perform a degassing process on a hydrogen pipe

Release lock with the lock pin:

xlck1=ON

Move the hydrogen tank from the hydrogen supply standby position to the hydrogen supply stop position using the stepping motor:

dcm1=dstp

STEP 7: Detect foreign matter or the like getting caught and perform the following getting-caught avoidance process when the motor torque value exceeds the predetermined value.

STEP 8: Move the hydrogen tank to the hydrogen supply standby position using the stepping motor:

dcm1=dstb

Perform lock with the lock pin:

xlck1=OFF

Stop stepping motor control:

xmot1=OFF

STEP 7: Continue the following normal operation when the motor torque value is equal to or less than the predetermined value.

Perform lock with the lock pin:

xlck1=OFF

Figure 6:
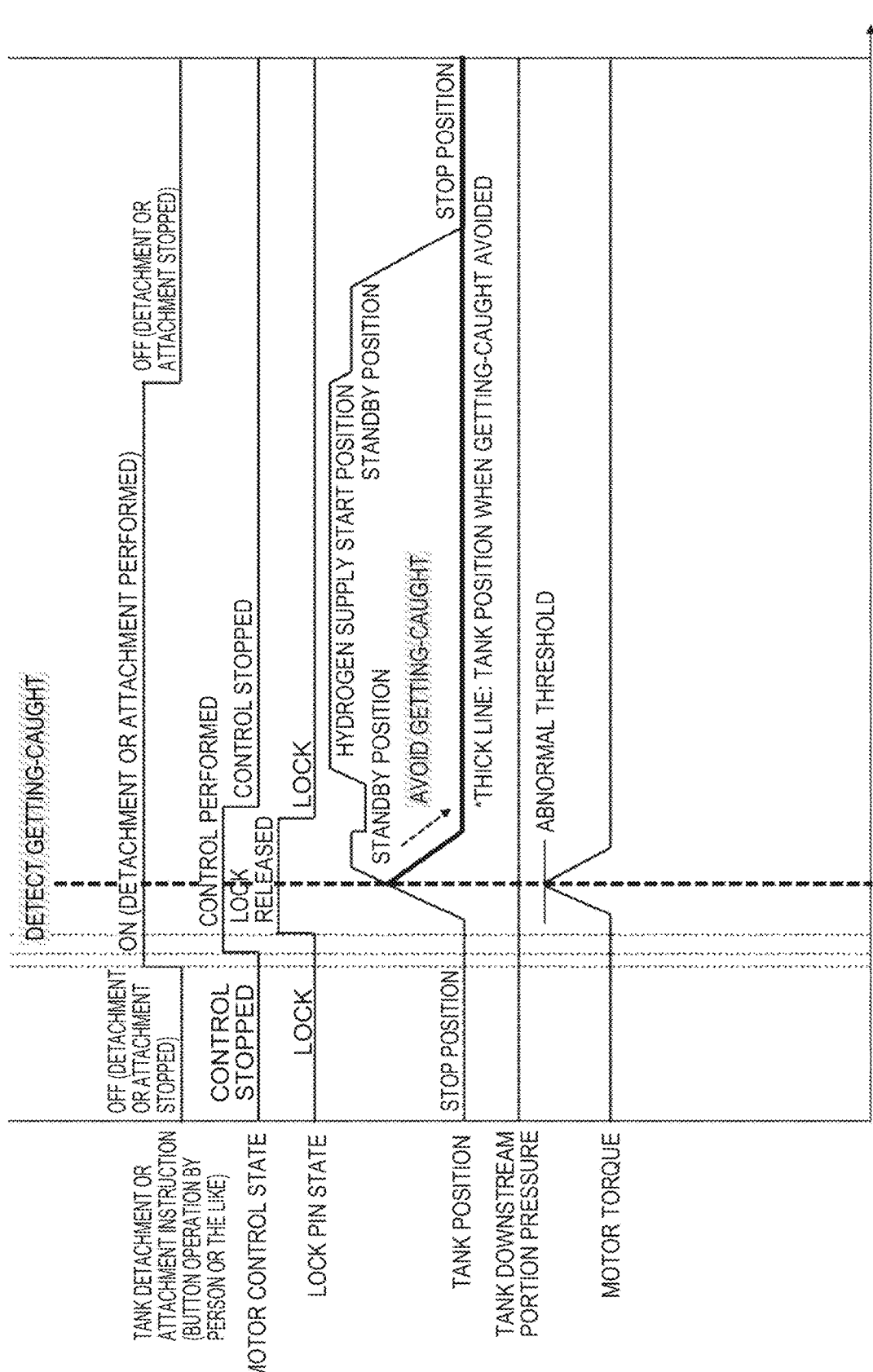
FIG. 6 is a diagram showing an example of a time chart when foreign matter or the like getting caught is detected during attachment control of the hydrogen tank shown in FIG. 4.

Stop the stepping motor control:

xmot1=OFF dcm1: hydrogen tank position dstp: hydrogen supply stop position dstb: hydrogen supply standby position dsply: hydrogen supply start position xh2sply: hydrogen tank attachment or detachment control instruction xmot1: motor control state, ON: control started, OFF: control stopped xlck1: Lock pin state, ON: lock released, OFF: lock performed FIG. 6 is a diagram showing an example of a time chart when foreign matter or the like getting caught is detected during the attachment control of the hydrogen tank shown in FIG. 4.

What is claimed is:

1. A hydrogen supply system comprising:

a detachable hydrogen tank;

a hydrogen consumption apparatus that consumes hydrogen in the hydrogen tank; and a control device, wherein:

the hydrogen consumption apparatus includes a detachment and attachment mechanism that detaches the hydrogen tank from the hydrogen consumption apparatus and attaches the hydrogen tank to the hydrogen consumption apparatus;

the detachment and attachment mechanism includes a motor that controls detachment and attachment of the hydrogen tank from and to the hydrogen consumption apparatus; and when a torque value of the motor exceeds a threshold during the control of the detachment and attachment of the hydrogen tank from and to the hydrogen consumption apparatus, the control device returns the hydrogen tank to a position where a moving process in which the threshold being exceeded is detected is started.

2. The hydrogen supply system according to claim 1, wherein:

the control of the detachment and attachment of the hydrogen tank from and to the hydrogen consumption apparatus includes:

a detachment control of the hydrogen tank from the hydrogen consumption apparatus, the detachment control further includes moving the hydrogen tank from a hydrogen supply start position to a hydrogen supply standby position to allow detachment of the hydrogen tank from the hydrogen consumption apparatus, and moving the hydrogen tank from the hydrogen supply standby position to a hydrogen supply stop position to allow removal of the hydrogen tank from the hydrogen consumption apparatus; and an attachment control of the hydrogen tank to the hydrogen consumption apparatus, the attachment control further includes moving the hydrogen tank from the hydrogen supply stop position to the hydrogen supply standby position to allow attachment of the hydrogen tank to the hydrogen consumption apparatus, and moving the hydrogen tank from the hydrogen supply standby position to the hydrogen supply start position to allow the supply of hydrogen to the hydrogen consumption apparatus from the hydrogen tank;

wherein, in the detachment control, the control device returns the hydrogen tank to the hydrogen supply standby position if the torque value of the motor exceeds the threshold while moving the hydrogen tank from the hydrogen supply standby position to a hydrogen supply stop position, and wherein, in the attachment control, the control device returns the hydrogen tank to the hydrogen supply stop position if the torque value of the motor exceeds the threshold while moving the hydrogen tank from the hydrogen supply stop position to the hydrogen supply standby position.

3. The hydrogen supply system according to claim 1, wherein:

the detachment and attachment mechanism includes a detachment and attachment device to which the hydrogen tank is detachably attached; and the detachment and attachment device includes a movable portion that moves the hydrogen tank through control of the motor, and a fitting portion to be fitted with the hydrogen tank.

4. The hydrogen supply system according to claim 3, wherein:

the hydrogen tank has a first connection portion;

the fitting portion has a second connection portion; and the first connection portion of the hydrogen tank and the second connection portion of the fitting portion are connected to each other when the hydrogen tank is fitted to the fitting portion.

5. The hydrogen supply system according to claim 4, wherein:

the first connection portion is an on-off valve; and the second connection portion is a push rod.

* * * * *